May 1, 1962   H. O. EDGINGTON   3,031,789
AUTOMATIC DIP-NET
Filed July 22, 1960   2 Sheets-Sheet 1
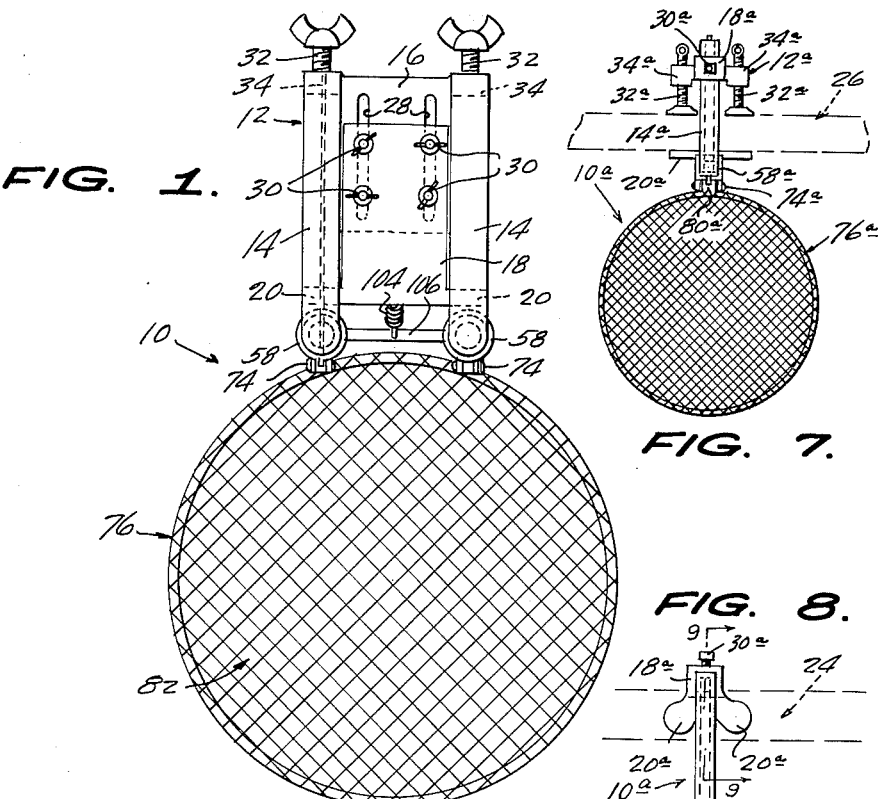
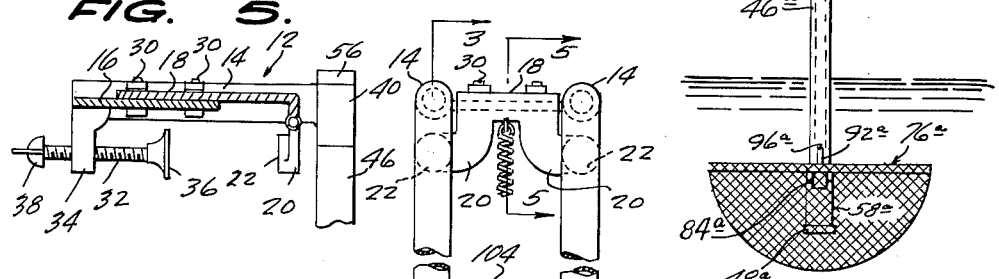
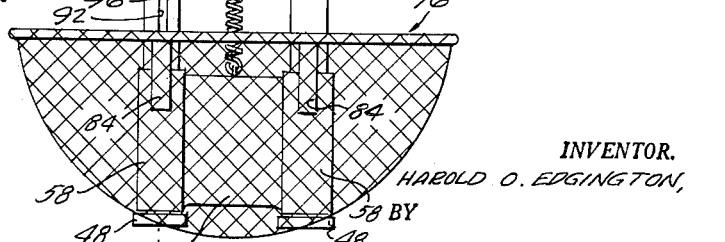
INVENTOR.
HAROLD O. EDGINGTON,
BY McMorrow, Berman & Davidson
ATTORNEYS.

May 1, 1962 H. O. EDGINGTON 3,031,789
AUTOMATIC DIP-NET
Filed July 22, 1960 2 Sheets-Sheet 2
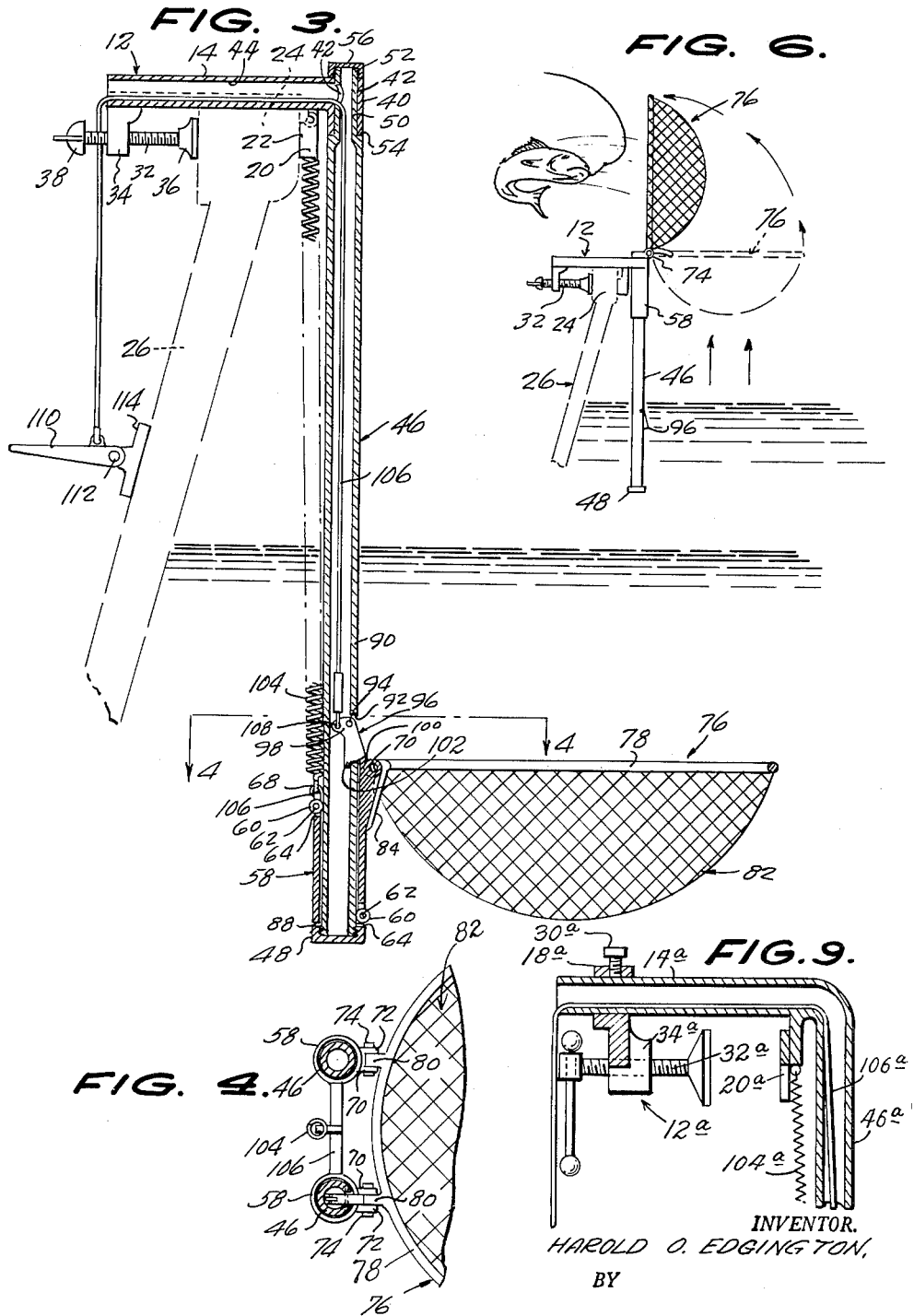
INVENTOR.
HAROLD O. EDGINGTON,
BY
McMorrow, Berman + Davidson
ATTORNEYS.

United States Patent Office 3,031,789
Patented May 1, 1962

3,031,789
AUTOMATIC DIP-NET
Harold O. Edgington, 206 Shely St., Corpus Christi, Tex.
Filed July 22, 1960, Ser. No. 44,723
11 Claims. (Cl. 43—11)

This invention relates to improvements in fish-landing nets, and more particularly to a novel automatic dip-net adapted to be mounted on boat hulls and other supports from which the fishing is done.

In fishing from boats even in favorable conditions, the operation of landing or boating a fish with an ordinary dip-net usually calls for patience and skill in the repeated efforts required to reel in the fish to the side of the boat, within reach of a dip-net, in holding the fish where it can be reached by the dip-net, and in manipulating the dip-net to pick up and deposit the fish in the boat. Where conditions are adverse, as with wind and/or rough water, or with the fish still fighting and running, the likelihood of losing the fish is greatly increased and the fisherman is subjected to a tiring and sometimes dangerous operation.

The primary object of the present invention is the provision of an efficient and practical automatically operating dip-net which eliminates the otherwise required manipulation of a dip-net simultaneously with the playing of a fish, for landing a fish, and leaves the fisherman's two hands free for playing the fish to the dip-net, the dip-net being normally submerged in the water and being adapted to be automatically elevated beneath a fish, by release of a trigger, so that the netted fish is raised out of the water and can be flipped into the boat or onto a pier or dock or other support.

A further object of the invention is to provide a rugged, simple and reliable automatic device of the character indicated above which involves an adjustable capacity clamp for mounting the device, as on the gunwale of a boat hull, rigid slide rod means fixed to and depending from the clamp to below water level, a slide means engaged with the slide rod means, a net frame fixed to and extending laterally from the slide means, trigger means on the rod means for holding the net frame in the water, and operating means adapted to be installed in the boat hull, for releasing the trigger, and contractile spring means connected to the slide means for pulling the net frame up out of the water, to gunwale height, upon release of the trigger.

A still further object of the invention is to provide a device of the character indicated above, wherein the net frame is pivotally supported on the slide means, so that the net frame, on reaching the top of its travel, can automatically overbalance itself to throw a fish held in its net, into the boat or onto a support.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a device of the invention per se;

FIGURE 2 is a contracted front elevation of the device;

FIGURE 3 is a transverse vertical section taken on the line 3—3 of FIGURE 2, showing the device mounted on a boat hull gunwale, with the net frame held in its lowermost or depressed position by a trigger latch;

FIGURE 4 is a fragmentary horizontal section taken on the line 4—4 of FIGURE 3;

FIGURE 5 is a fragmentary transverse vertical section taken on the line 5—5 of FIGURE 2;

FIGURE 6 is an end elevation, on a reduced scale, showing the net frame in its top-most position and pivoted to throw a fish into the boat on which the device is mounted;

FIGURE 7 is a top plan view, on a reduced scale, showing a modified device of the invention mounted on a boat hull gunwale, and having a single slide rod and slide, rather than two slide rods and slides; and FIGURE 8 is an outer end elevation of the device of FIGURE 7.

FIGURE 9 is an enlarged sectional view taken on the line 9—9 of FIGURE 8.

Referring in detail to the drawings, wherein like and related numerals designate like and related parts throughout the several views, and first to FIGURES 1 to 6, the automatic dip-net device therein shown, and generally designated 10, comprises a horizontal clamp 12 which is composed of a pair of laterally spaced parallel, preferably tubular horizontal arms 14 which are spaced and connected by a web plate 16 located at their inward ends. Slidably bearing, at its endward end, on the web plate 16 is a horizontal jaw plate 18, whose side edges can be in sliding contact with the facing sides of the arms 14. On the outer end of the jaw plate 18 is a pair of laterally spaced, vertical depending J-shaped clamping jaws 20, having oppositely directed terminals on whose sides are circular bosses 22 which are adapted to make contact with the support for the device, such as the outer or outboard side of the gunwale 24, of a boat hull side 26, as shown in FIGURE 3. The web plate 16 is provided with a pair of laterally spaced longitudinal adjustment slots 28, and pairs of bolts 30, fixed in the jaw plate 18, extend downwardly through the slots, for clamping the jaw plate 18 to the web plate 16 in longitudinally adjusted relationship thereto, for accommodating gunwales 24 of different widths. Opposed to the jaws 20 are horizontal clamping screws 32 which are threaded through lugs 34 fixed to and depending from the arms 14, at the inward ends thereof, the screws 32 having jaw heads 36 on one end and winged heads 38 on the other end.

Fixed or formed on the outward ends of the arms 14 are relatively short vertical sleeves 40, open ends of which extend above and below the arms 14 and whose bores open, as indicated at 42, at one side thereof, into the bores 44 of the arms 14, as shown in FIGURE 3. Extending downwardly from each sleeve 40 is a straight vertical perpendicular, tubular slide rod 46 which is closed, at its lower end, by an enlarged diameter cap 48, which serves also as a slide stop. At their upper ends, the slide rods 46 have reduced diameter extensions 50 having externally threaded upper ends 52, and defining annular shoulders 54 where the extensions meet the rods. The extensions 50 are engaged upwardly through the sleeves 40, with the shoulders 54 against the lower ends of the sleeves, and with the threaded upper ends 52 of the extensions reaching above the upper ends of the sleeves, with retaining caps 56 threaded on the upper ends 52 and bearing securably against the upper ends of the sleeves. This manner of assembling the slide rods 46 to the clamp 12 makes it feasible, when desired, to dismantle the device for easier carrying and storage.

Slidably circumposed on the slide rods 46 are relatively short tubular slides 58, which, for easy working on the slide rods, have roller bearings 60 mounted on axles 62 extending across and secured to the sides of openings 64 in the slide side wall at opposite ends of the slides. On and extending above the upper ends 68 of the slides 58, at the outer sides thereof, are enlarged in cross section, preferably solid brackets 70, having pairs of laterally spaced, outwardly projecting ears 72, between which extend pivot pins 74.

The device 10 further comprises a net frame 76 comprising a rigid ring 78, preferably circular in form, which has extending from its inward side, lugs 80 which are pivoted on the pivot pins 74, between related ears 72. A net 82, of suitable materials, is secured to and extends across the net frame ring 78, and hangs downwardly therefrom at its center. Fixed to and extending downwardly from the ring 78, in the regions of the lugs 80, are inwardly and downwardly angled stop fingers 84, which, in the normal horizontal position of the net frame 76, bear against the outer sides of the slides 58, at locations below the axes of the pivot pins 74, and hold the net frame in horizontal position.

At a location above the upper end 68 of one of the slides 58, when in its depressed position, wherein the lower ends 88 of the slides are close to or are engaged with the stop caps 48, on the lower ends of the slide rods 46, the side wall 90 of said one slide rod is formed, in its outer side, with a vertical closed slot 92, through which works the pivot pin 94 carrying a latch 96.

The latch 96, as shown in FIGURE 3, is a flat vertical plate which is engaged, at its upper end on a pivot 94, and has, at its upper end, an inwardly extending lever arm 98. The lower end of the latch 96 is formed with a convexly curved retaining edge 100, at whose inward end is a depending stop lug 102, which can engage the inward side of the slide rod side wall 90, below the lower end of the slot 92. The latch 96 is normally in outwardly tilted retaining position, with its retaining edge 100 engaged with the upper end of the bracket 70 of said one slide, whereby the slides 58 are held down in their depressed positions, against the upward pull of an actuating spring 104.

As shown in FIGURES 2, 3 and 4, the actuating spring 104, which can be a heavy elastic rubber rope, for water deterioration resistance, is secured at its ends to and stretched between a cross bar or web 106 which extends between and is fixed to the slides 58, and a central part of the jaw plate 18, between the jaws 20.

For releasing the latch 96 from the slide bracket 70, to enable the spring 104 to contract and pull the slides and the net frame 76 forcibly upwardly to their topmost positions, a cord or cable 106 is provided and is trained freely through the related slide rod 46 and through an adjacent one of the clamp arms 14, the cable being suitably and pivotally connected, at one end, as indicated at 108, to the latch lever arm 98, and at its other end, to a trigger lever 110, which is pivoted, as indicated at 112, in a bracket 114, the bracket 114 being adapted to be mounted at a suitable location, as on the inward side of a boat hull side 26, below its gunwale 24, as shown in FIGURE 3.

In operation, the net frame 76 being latched in its underwater depressed position, all that a fisherman need do, in order to land a hooked fish, is to work the fish to a position over the net frame 76, and trip the trigger lever 110 downwardly, so that the net frame rises and lifts and confines the fish in the net 82, and elevates the netted fish to the level of the gunwale 24. If a spring 104 of sufficient power be used, the force of the rise of the sleeves 58 and the net frame 76, combined with the sudden arresting of the sleeves and the net frame, as the upper ends of the sleeves strike the clamp arms 14, serves to flip the net frame 76 upwardly and inwardly, as shown in FIGURE 6, so that the netted fish is automatically thrown into the boat, as a result of operation of the device. Where a weaker spring is used, and automatic dumping of the fish is not provided for, the fisherman can easily tilt the net frame 76 so as to manually deposit the fish in the boat.

The modified device of the invention, shown in FIGURES 7, 8, and 9, and generally designated 10a, differs from the device of FIGURES 1 to 6 principally in the use of a single polygonal and preferably square cross section slide rod 46a with a single polygonal slide 58a engaged thereon, instead of two slide rods and two slides, the polygonal cross sections of the slide rods and sleeves serving to preclude rotation of the slide 58a relative to the slide rod 46a, as do the two slide rods and sleeves of FIGURES 1 to 6. The clamp 12a involves a single polygonal arm 14a which is fixed, at its outer end, to the upper end of the slide rod 46a, and which slides through a polygonal clamping sleeve 18a, provided with a set screw 30a. On the sleeve 18a are outlying lugs 34a containing clamping screws 32a, which are opposed to clamping jaws 20a, the jaws 20a being fixed to and extended downwardly from the single arm 14a. The device 10a includes a net frame 76a. In addition, there is a closed slot 92a in the slide rod 46a in which works a latch 96a. Also, there is an angled stop finger 84a which bears against the outer side of the slide 58a and holds the net frame 76a in horizontal position. An actuating spring 104a is secured at its ends to and stretched between a crossbar or web 20a which extends between and is fixed to the slide 58a.

It will be observed that either form of device of the invention readily lend themselves to being manufactured, at relatively low cost, due to their relatively simple constructions and the small number of simple and easily assembled components, to being made in different sizes and dimensions, to suit boat hulls having different heights, and to provide nets of desired proportions.

Although there has been shown and described herein preferred forms of the invention, it is to be understood that the invention is not necessarily confined thereto, and that any change or changes in the structures of and in the relative arrangements of components thereof are contemplated as being within the scope of the invention as defined by the claims appended hereto.

What is claimed is:

1. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position when released, releasable latch means on said rod means and engageable with the slide means only in the depressed position thereof, a net frame mounted on said slide means, said net frame being pivoted on the slide means and normally extending normal to the slide means, and stop means for holding the net frame in a position normal to the slide rod means, said slide means being engageable wtih a part on said mounting means as the slide means is elevated along the slide rod means by the spring with sufficient velocity to produce swinging of the net frame toward the mounting means as it engages said part.

2. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position when released, releasable latch means on said rod means and engageable with the slide means only in the depressed position thereof, a net frame pivotally mounted on and normally extending normal to said slide means, and stop means for holding the net frame in a position normal to the slide rod means, said slide means being engageable with a part on said mounting means as the slide means is elevated along the slide rod means by the spring with sufficient velocity to produce swinging of the net frame toward the mounting means as it engages said part, said slide rod means comprising a pair of laterally spaced slide rods, and said slide means comprising slides severally engaged on the slide rods.

3. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position when released, releasable latch means on said rod means and engageable with the slide means only in the depressed position thereof, a net frame pivotaly mounted on and normally extending normal to said slide means, and stop means for holding the net frame in a position normal to the slide rod means, said slide means being engageable with a part on said mounting means as the slide means is elevated along the slide rod means by the spring with sufficient velocity to produce swinging of the net frame toward the mounting means as it engages said part, said slide rod means comprising a single slide rod and said slide means comprising a single slide engaged on the slide rod, and means precluding rotation of the slide on the slide rod.

4. An automatic dip-net comprising mounting means, vertical slide rod means fixed to and extending downward from said mounting means, slide means engaged on said rod means for movement from a depressed to an elevated position, spring means adapted to be tensioned by movement of the slide means toward its depressed position for forcing the slide means toward its elevated position when released, releasable latch means on said rod means and engageable with the slide means only in the depressed position thereof, and a net frame mounted on said slide means, said mounting means comprising a clamp extending laterally from the slide rod means on the side thereof remote from the net frame, said clamp comprising arm means to which the slide rod means is fixed, jaw plate means extending laterally from said arm means, fixed jaws extending laterally from said plate means, lug means extending laterally from said plate means and opposed to said jaws, and clamping screws threaded through the lug means in line with the jaws.

5. An automatic dip-net comprising mounting means, vertical slide rod means fixed to and extending downward from said mounting means, slide means engaged on said rod means for movement from a depressed to an elevated position, spring means adapted to be tensioned by movement of the slide means toward its depressed position for forcing the slide means toward its elevated position when released, releasable latch means on said rod means and engageable with the slide means only in the depressed position thereof, and a net frame mounted on said slide means, said mounting means comprising a clamp extending laterally from the slide rod means on the side thereof remote from the net frame, said clamp comprising arm means to which the slide rod means is fixed, jaw plate means extending laterally from said arm means, fixed jaws extending laterally from said plate means, lug means extending laterally from said plate means and opposed to said jaws, and clamping screws threaded through the lug means in line with the jaws, said plate means having sleeve means thereon through which said arm means is slidably engaged, and clamp screw means on said sleeve means for locking the arm means in adjusted relationship to the sleeve means.

6. An automatic dip-net comprising mounting means, vertical slide rod means fixed to and extending downward from said mounting means, slide means engaged on said rod means for movement from a depressed to an elevated position, spring means adapted to be tensioned by movement of the slide means toward its depressed position for forcing the slide means toward its elevated position when released, releasable latch means on said rod means and engageable with the slide means only in the depressed position thereof, and a net frame mounted on said slide means, said mounting means comprising a clamp extending laterally from the slide rod means on the side thereof remote from the net frame, said clamp comprising arm means to which the slide rod means is fixed, jaw plate means extending laterally from said arm means, fixed jaws extending laterally from said plate means, lug means extending laterally from said plate means and opposed to said jaws, and clamping screws threaded through the lug means in line with the jaws, said plate means having sleeve means thereon through which said arm means is slidably engaged, and clamp screw means on said sleeve means for locking the arm means in adjusted relationship to the sleeve means, said sleeve means being a single sleeve and said arm means being a single arm.

7. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position when released, releasable latch means on said rod means and engageable with the slide means only in the depressed position thereof, a net frame pivotally mounted on and normally extending normal to said slide means, and stop means for holding the net frame in a position normal to the slide rod means, said slide means being engageable with a part on said mounting means as the slide means is elevated along the slide rod means by the spring with sufficient velocity to produce swinging of the net frame toward the mounting means as it engages said part, said slide rod means comprising a pair of laterally spaced slide rods, and said slide means comprising slides severally engaged on the slide rods, said spring means comprising a spring member, a web extending between and connected to the slides, said spring member being stretched between and connected to said web and a part on said mounting means.

8. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position when released, releasable latch means on said rod means and engageable with the slide means only in the depressed position thereof, a net frame pivotally mounted on and normally extending normal to said slide means, and stop means for holding the net frame in a position normal to the slide rod means, said slide means being engageable with a part on said mounting means as the slide means is elevated along the slide rod means by the spring with sufficient velocity to produce swinging of the net frame toward the mounting means as it engages said part, said slide rod means comprising a pair of laterally spaced slide rods, and said slide means comprising slides severally engaged on the slide rods, said spring means comprising a spring member, a web extending between and connected to the slides, said spring member being stretched between and connected to said web and a part on said mounting means, one of said slide rods being tubular and having a side wall provided with a longitudinal slot, said latch means comprising a latch plate pivoted on the side wall and working through said slot to engage a related slide, a lateral arm on said latch plate, and a cable connected to said lateral arm, said cable being trained through the tubular slide rod and engaged with the mounting means.

9. An automatic dip-net comprising mounting means, vertical slide rod means fixed to and extending downwardly from said mounting means, slide means engaged on said rod means for movement thereon from a depressed position to an elevated position, spring means adapted to be tensioned by movement of the slide means toward its depressed position for forcing the slide means toward its elevated position, releasable latch means on said rod means and engageable with the slide means only in the depressed position thereof, a net frame pivotally mounted on and normally extending normal to said slide means, and stop means for holding the net frame in a position normal to the slide rod means, said slide means being engageable with a part on said mounting means as the slide means is elevated along the slide rod means by the spring with sufficient velocity to produce swinging of the net frame toward the mounting means as it engages said part, said slide rod means comprising a pair of laterally spaced slide rods, and said slide means comprising slides severally engaged on the slide rods, said spring means comprising a spring member, a web extending between and connected to the slides, said spring member being stretched between and connected to said web and a part on said mounting means, one of said slide rods being tubular and having a side wall provided with a longitudinal slot, said latch means comprising a latch plate pivoted on the side wall and working through said slot to engage a related slide, a lateral arm on said latch plate, and a cable connected to said lateral arm, said cable being trained through the tubular slide rod and engaged with the mounting means, said mounting means having a tubular member through which said cable is trained for connection to an element engaged with a support on which the mounting means is mounted.

10. In combination, a boat hull side having a gunwale, an automatic dip-net comprising a clamp secured over the gunwale, slide rod means fixed to the clamp and extending downwardly therefrom to below water level, stop means on the lower end of the slide rod means, slide means engaged on the rod means to move along the rod means from a depressed position engaging said stop means to an elevated position engaging said clamp, a net frame pivoted on said slide means at the side thereof remote from the clamp, said net frame being pivoted to swing from a horizontal depressed position to an elevated vertical position, means limiting depression of the net frame below a horizontal position, spring means stretched between and connected to the clamp and the slide means, latch means mounted on said slide rod means and engageable with the slide means only in the depressed position thereof, and a releasing cable secured to the latch means and leading inwardly over the gunwale.

11. In combination, a boat hull side having a gunwale, an automatic dip-net comprising a clamp secured over the gunwale, slide rod means fixed to the clamp and extending downwardly therefrom to below water level, stop means on the lower end of the slide rod means, slide means engaged on the rod means to move along the rod means from a depressed position engaging said stop means to an elevated position engaging said clamp, a net frame pivoted on said slide means at the side thereof remote from the clamp, said net frame being pivoted to swing from a horizontal depressed position to an elevated vertical position, means limiting depression of the net frame below a horizontal position, spring means stretched between and connected to the clamp and the slide means, latch means mounted on said slide rod means and engageable with the slide means only in the depressed position thereof, and a releasing cable secured to the latch means and leading inwardly over the gunwale, and a trigger lever pivoted on the boat hull side to which the cable is connected.

References Cited in the file of this patent

UNITED STATES PATENTS

| | | |
|---|---|---|
| 2,630,646 | Jensen et al. | Mar. 10, 1953 |
| 2,645,874 | Collins | July 21, 1953 |
| 2,795,888 | Garland | June 18, 1957 |
| 2,834,138 | Pedersen | May 13, 1958 |